United States Patent [19]

Berillon et al.

[11] Patent Number: 4,667,720

[45] Date of Patent: May 26, 1987

[54] FLAP FOR TIRES

[75] Inventors: Jean-Bernard Berillon, Ceyrat; Jean-Marc Daulon, St-Hippolyte; Jean-Philippe Maurel, Clermont-Ferrand, all of France

[73] Assignee: Compagnie Generale des Etablissements Michelin, Clermont-Ferrand, France

[21] Appl. No.: 821,500

[22] Filed: Jan. 22, 1986

[30] Foreign Application Priority Data

Jan. 29, 1985 [FR] France .................................. 85 01524

[51] Int. Cl.⁴ ................................................ B60C 5/02
[52] U.S. Cl. ..................................................... 152/501
[58] Field of Search ................................. 152/501, 513

[56] References Cited

U.S. PATENT DOCUMENTS 1,475,147 11/1923 Shively ................................ 152/501
4,063,584 12/1977 Takigawa ............................ 152/501

FOREIGN PATENT DOCUMENTS 69545 11/1958 France .................................. 152/501
202219 8/1923 United Kingdom ................. 152/501

OTHER PUBLICATIONS

Japanese Patents Abstract, JP 59-190007 (Publication No.), Bridgestone K.K., 4/11/83.

Primary Examiner—Michael Ball
Attorney, Agent, or Firm—Brumbaugh, Graves, Donohue & Raymond

[57] ABSTRACT

A flap for tires has lateral wings at the ends of which there is an extension which, in stress-free condition, is spaced axially inwards from the inner wall of the tire so that, upon inflation, the inner tube first of all protrudes towards the inside of the inflatable cavity before it is flattened against the tire.

4 Claims, 4 Drawing Figures

FLAP FOR TIRES

The present invention relates to improvements in the flaps used in tire assemblies for heavy vehicles. More particularly, it concerns the general shape of the flaps.

Tires for heavy vehicles such as, for instance, heavy trucks, which are used with an inner tube require the use of a flap. As is known, a flap is a protective ring interposed between, on one of its sides, the inner tube and, on its other side, the rim and the beads of the tire which is mounted on the rim. The radial section of the flap has a generally U shape, the central portion of which is applied against the rim and the lateral wings against the beads. The flap avoids the pinching of the inner tube between the rim and the beads and protects the inner tube from contact with the rim, which may become substantially heated as a result of the operation of the brakes.

The known flaps, however, provide only insufficient protection for the inner tube, the rupturing of which is frequently noted even after rather brief use, in the region where it leaves the flap in order to rest against the tire. In order to improve the fatigue behavior of this critical zone of the inner tubes, U.S. Pat. No. 4,063,584 has proposed establishing the radial height of the wings of a flap as a function of the height of the flange of the rim with which it is used. In addition to the fact that it is not very convenient to have to use different flaps depending on the height of the rim flange used, this arrangement has proven insufficient to prevent the rupturing of the inner tube in the critical zone.

The object of the present invention is to provide a flap which effectively protects the inner tube without introducing new disadvantages.

The flap of the present invention comprising a substantially cylindrical central portion intended to be applied against the bottom of a rim and two lateral wings intended to be applied against the inner wall of the beads of a tire and inclined approximately at the same angle as the inner wall is characterized by the fact that each lateral wing is terminated radially outwards by an extension which, in stress-free condition, is spaced axially inwards from the inner wall.

The invention will be fully understood with the aid of an embodiment which will now be described with reference to the accompanying drawings, in which.

Figure 1:
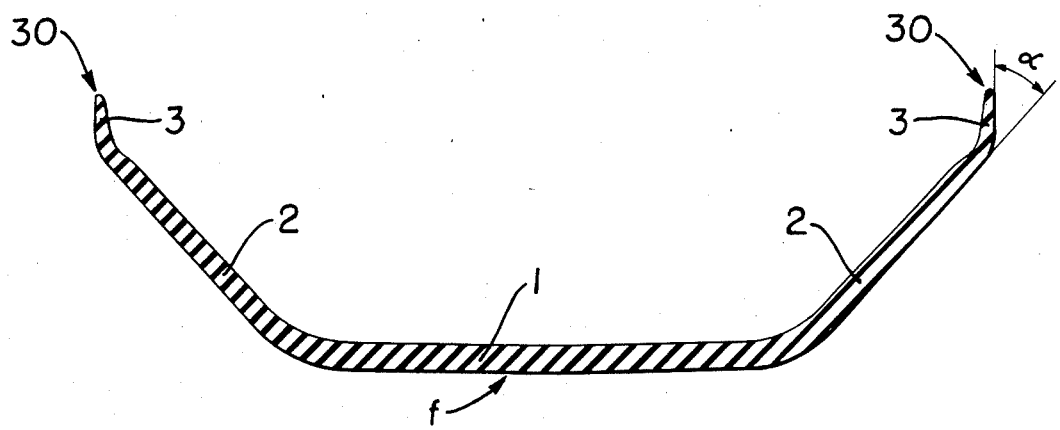
FIG. 1 is a radial section through a flap according to the invention.

The flap f, seen in cross section in FIG. 1, comprises a substantially cylindrical central portion 1 intended to protect the inner tube from contact with the rim, as well as two inclined lateral wings 2. When a flap is incorporated in a tire, these lateral wings 2 apply themselves against the inner wall of the beads. According to the invention, each lateral wing 2 is terminated by an extension 3. In stress-free condition, that is to say when the flap is mounted in the tire but the inner tube is not inflated, the extension 3 is spaced axially inwards from the inner wall of the bead of the tire with which the flap is used. This extension 3 may advantageously be inclined by an angle of about 40° with respect to the adjacent lateral wing 2. The radially outer end 30 of the extension 3 is preferably rounded. The radius of the rounding may advantageously be between 0.1 and 0.6 mm. For this purpose, when the flap is produced by molding there is no joint between the parts of the mold at this place, so as to avoid a molding burr at this radially outer end. The joint between the parts of the mold is preferably provided lower down (radially) on the axially outer face of the flap.

Figure 2:
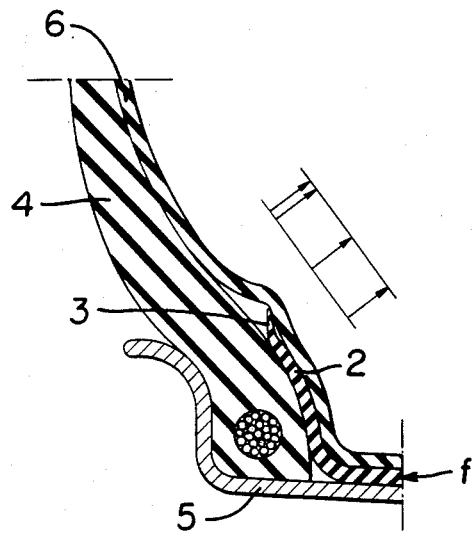
FIGS. 2, 3 and 4 show the mounting of a flap according to the invention.

FIG. 2 and the following figures show part of a tire assembly in different stages of mounting. There can be noted therein a tire bead 4, a rim 5, an inner tube 6, a flap f and, in each case, a graph showing the rate of elongation of the inner tube 6 as a function of the curvilinear abscissa considered along the radial section of the inner tube 6.

FIG. 2 shows the configuration of the tire assembly when the inner tube 6 is at a pressure slightly greater than atmospheric pressure and just sufficient so that the inner tube 6 has come into contact with the lateral wings 2 of the flap f as well as with the tire. Due to the presence of the extension 3, which, in accordance with the present invention, protrudes into the inside of the inflatable cavity of the tire, the inner tube 6 itself forms a protrusion. Stated differently, at the place of the extension 3, the inner tube 6 is developed with a greater length than the length projected onto the inner wall of the bead 4. However, this deformation which is imposed upon the inner tube 6 during inflation takes place with a substantially constant rate of elongation. This is illustrated in the graph.

Figure 3:
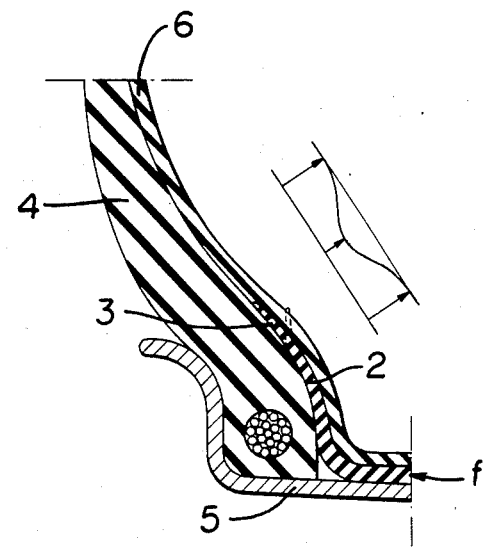

FIG. 3 shows the configuration of the tire assembly at a slightly higher pressure, sufficient to flatten the extension 3 against the inner wall of the bead 4. The previous position is shown in dashed line. When the inflation pressure flattens the inner tube 6 against the tire, the pressure causes a decrease in the rate of elongation of the inner tube 6 in the region adjacent the extension 3. The length projected onto the inner wall of the bead 4 is less than the initial developed length of the inner tube 6.

Figure 4:
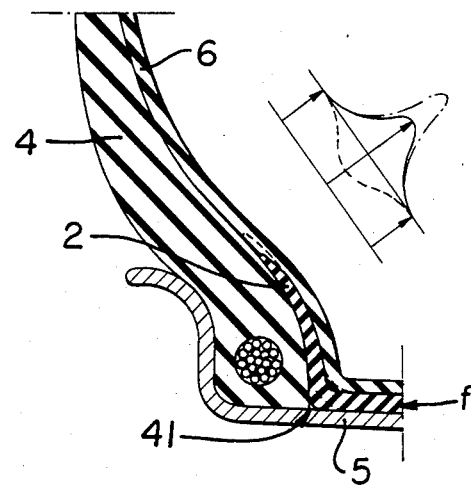

Finally, FIG. 4 shows the configuration of the tire assembly at the rated pressure. The intermediate position is shown in dashed lines. During the final inflation, under the effect of the substantial pressure the lateral wings 2 can slide radially inwards, because the flap f, which is relatively non-stretchable (compared with the inner tube 6) is applied firmly against the bead 4 and the rim 5, thus causing the disappearance of a space which has remained free alongside the tip 41 of the bead 4. This placing in final position takes place in similar manner for most types of flaps. It is always accompanied by a substantial elongation of the inner tube 6 in a critical zone located in the vicinity of the radially outer end of the wings 2 of the flap f. However, due to the extensions 3 of the flap f of the present invention, the role of which at the start of inflation has just been explained, the inner tube 6 has an elongation reserve in this critical zone. In fact, the elongation rate has decreased during the intermediate phase during which the extension 3 has been flattened against the tire. Due to this, the final rate of elongation shown in the graph is actually less than the rates of elongation observed when using an ordinary flap (which rate has been shown in dashed axis lines on the graph of the rates of elongation). Due to this, the inner tube works in service at a lower stress level, which is very favorable to its life.

What is claimed is:

1. A flap for use in a tire to be mounted with an inner tube comprising a substantially cylindrical central portion intended to be applied against the bottom of a rim and two lateral wings intended to be applied against the inner wall of the beads of a tire and inclined approximately at the same angle as the inner wall, characterized by the fact that each lateral wing is terminated radially outwards by an extension which, in stress-free condition, is spaced axially inwards from the inner wall of the tire in whcih it is mountable in order that, at the beginning of the inflation procedure, the inner tube forms at first a protrusion into the inside of the inflatable cavity of the tire when coming into contact with said extension, and thereafter the extension is flattened against the inner wall of the bead when the pressure increases.

2. A flap according to claim 1, characterized by the fact that the extension has a radially outer end which is rounded.

3. A flap according to claim 2, characterized by the fact that the radius of the rounding of the radially outer end is between 0.1 and 0.6 mm.

4. A flap according to either Claim 1 or 3, characterized by the fact that the extension is inclined at an angle of about 40° with respect to the adjacent lateral wing.

* * * * *